Dec. 8, 1964 A. J. DETRIXHE 3,159,921

DISTANCE MEASURING DEVICE

Filed April 16, 1962

INVENTOR.
Arvid J. Detrixhe

BY
Hovey, Schmidt, Johnson & Hovey
ATTORNEYS.

__United States Patent Office__

3,159,921
Patented Dec. 8, 1964

3,159,921
DISTANCE MEASURING DEVICE
Arvid J. Detrixhe, Rte. 2, Ames, Kans.
Filed Apr. 16, 1962, Ser. No. 187,735
5 Claims. (Cl. 33—141)

This invention relates to distance measuring means, and more particularly, to a measuring device which may be operably coupled to the wheel of a vehicle so that the distance travelled by the vehicle may be computed.

A conventional tachometer on an automobile, for instance, has means employed therewith for determining the distance travelled by the automobile, which means is graduated generally so as to read to tenths of a mile. Although this is satisfactory in many cases, it is sometimes desired to measure more accurately the distances travelled by the automobile than is capable with the measuring means on the tachometer. This is especially true where a farmer desires to know the distance between two points spaced considerably apart so as to preclude the use of ordinary measuring tapes or rules, and where the distance between the points can best be covered with a vehicle.

The present invention overcomes the disadvantages of the measuring means on the aforesaid tachometer and provides a means for measuring the revolutions of a wheel on a vehicle so that, knowing the circumference of the wheel, the distance travelled by the vehicle may be computed.

It is, therefore, the primary object of the present invention to provide counter means which may be operably coupled to a wheel of a vehicle adjacent the axis of rotation of the wheel so that the counter means may sense the number of revolutions of the wheel to thereby permit calculation of the distance travelled by the vehicle.

Another object of the present invention is the provision of a revolution counter of the aforesaid character which includes a reciprocating weight placed on the diameter of the wheel and operably coupled to a counter device, whereby as the wheel rotates, the weight reciprocates once for each revolution of the wheel to thereby actuate the counter device for each cycle of reciprocation thereof.

Other objects of this invention will become apparent as the following specification progresses.

Figure 1:
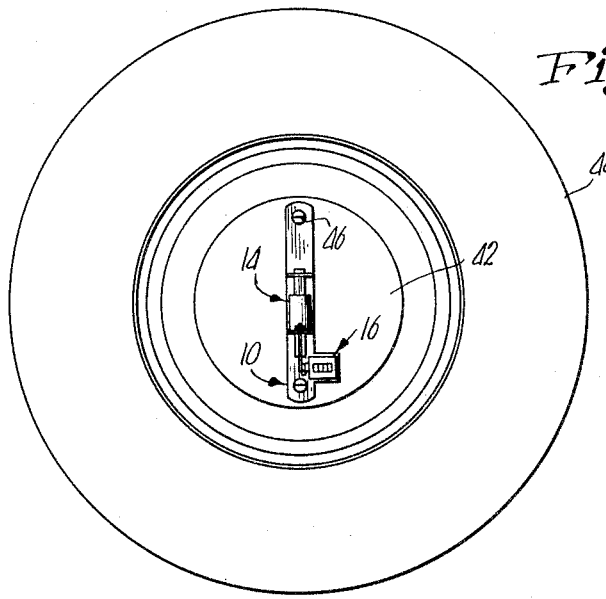
Figure 4:
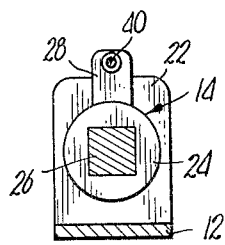
Figure 2:
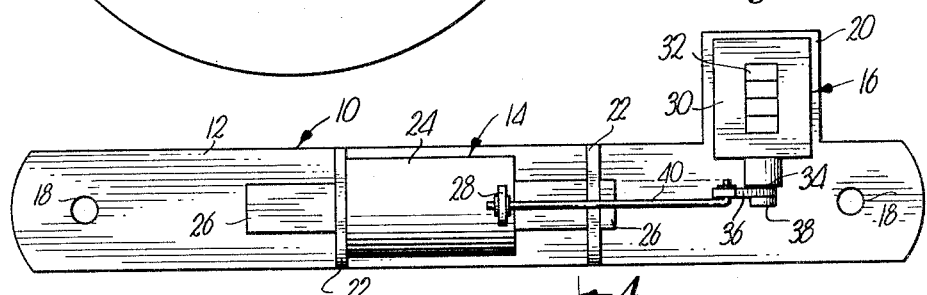
Figure 3:
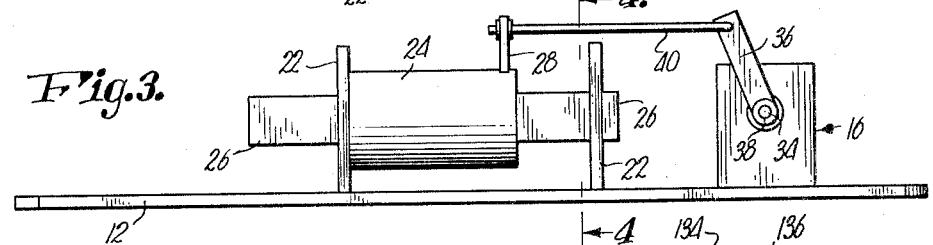
Figure 5:
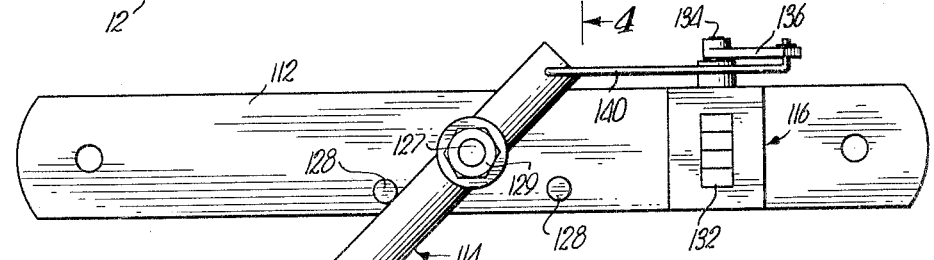

In the drawing:
FIGURE 1 is a side elevational view of a vehicle wheel with the counter of the present invention operably coupled therewith;
FIG. 2 is a plan view of one embodiment of the counter;
FIG. 3 is a side elevational view thereof;
FIG. 4 is a cross-sectional view taken along line 4—4 of FIG. 3; and
FIG. 5 is a plan view of another embodiment of the present invention.

The present invention includes a support in the nature of an elongated bar to which is secured a conventional counter device and a reciprocating actuator. The bar is adapted to be operably coupled to a wheel adjacent the hub thereof and on a diameter of the wheel.

One embodiment of the present invention includes an actuator having a weight reciprocable along the length of the bar and operably coupled to the counter device for actuating the latter each time that the weight makes a complete cycle of reciprocation.

Another embodiment of the present invention includes a rotatable arm having a mass at one end thereof and coupled at the opposite end thereof with a counter device, the axis of rotation of the arm being intermediate the ends thereof.

In FIG. 2, the first embodiment of the present invention is illustrated and includes a support 10 in the nature of an elongated, rigid bar 12, an actuator 14 mounted on bar 12 for reciprocating movement, and a counter device 16 rigid to bar 12 and coupled with actuator 14 to indicate a complete cycle of movement of the latter.

Bar 12 is provided with a pair of apertures 18 adjacent the ends thereof, and a projecting platform 20 proximal to one end thereof upon which counter device 16 is rigidly attached. A pair of spaced plates 22 is mounted on bar 12 intermediate the ends thereof and extends outwardly therefrom. Each plate 22 is provided with a central opening therethrough, the openings in the plates 22 being aligned.

Actuator 14 includes a cylindrical mass or weight 24 having stems 26 projecting outwardly therefrom in opposed directions at the ends thereof. Stems 26 are received within the openings in respective plates 22 so as to position weight 24 between plates 22 as is clear in FIGS. 2 and 3. The openings in plates 22 are preferably polygonal and the transverse cross section of each of stems 26 is also polygonal to conform to the configuration of the corresponding opening. As shown in FIG. 4, stem 26 is transversely square. Thus, weight 24 is prevented from rotating about its axis as the same reciprocates between plates 22. Weight 24 is provided with an ear 28 thereon adjacent one end thereof and projecting outwardly therefrom. Ear 28 is provided with an aperture therethrough at the outer end thereof.

Counter device 16 includes a housing 30 rigid to the platform 20 in any suitable manner, housing 30 containing therewithin a number of cylindrical spools having indicia on the outer surface thereof which may be viewed through a window 32 in housing 30. A shaft 34 operably coupled to the spools within housing 30 projects outwardly from the latter and receives a crank arm 36 which is held thereon by a fastener 38. A rod 40 is pivotally received within an aperture in the end of crank arm 36 and extends into and through the aperture in ear 28. Means is provided for securing rod 40 to ear 28 to prevent relative movement therebetween.

Counter device 16 is adapted to be actuated each time crank arm 36 is swung through a limited arc. The actuation of counter device 16 is sufficient to advance the spools therein in the usual manner.

In operation, bar 12 is affixed to the hub region 42 on the wheel 44 of a vehicle so that the longitudinal axis of bar 12 lies on a diameter of wheel 44. Screws 46 are received in apertures 18 and are threadably mounted to wheel 44 in any suitable manner so that weight 24 is located on or adjacent the axis of revolution of wheel 44. Preferably, plates 22 are evenly spaced on either side of the axis of revolution of wheel 44.

As wheel 44 rotates, weight 24 reciprocates between plates 22, the latter serving as stops to limit the travel of weight 24. Each time weight 24 traverses the distance from one plate 22 to the other plate 22 and return, counter device 16 is actuated to register a single unit. Thus, the number of revolutions of wheel 44 may be sensed and recorded by counter device 16. If the circumference of the wheel 44 is known, the distance travelled by the wheel may be calculated by multiplying the number of revolutions indicated on device 16 by the circumference of wheel 44. The resulting product will give a highly accurate distance measurement which could not otherwise be obtained by an individual while riding in the vehicle to which wheel 44 is attached.

The embodiment of the invention illustrated in FIG. 5 includes a bar 112 having an actuator 114 thereon intermediate the ends thereof, and a counter device 116 similar in all respects to counter device 16 of the first embodiment.

Actuator 114 includes an elongated arm 126 which is pivotally mounted intermediate the ends thereof on bar 112 by means of a pin 127. A nut 129 is threadably mounted on pin 127 to maintain arm 129 on the latter.

A mass or weight 124 is rigid to one end of arm 126, and a rod 140 is swingably mounted on the opposite end thereof. Rod 140 is pivotally mounted within an aperture at one end of a crank arm 136 rigid to the shaft 134 of counter device 116, the latter having a window 132 therein for viewing the indicia on the rotatable, indicia carrying spools thereof.

In operation, the embodiment shown in FIG. 5 is utilized in the same manner as the embodiment shown in FIGS. 1-4. Bar 112 is secured to a wheel such as wheel 44 so that the longitudinal axis of bar 112 lies along a diameter of the wheel.

As the wheel rotates, arm 126 rotates through a limited arc about pin 127 as weight 124 moves downwardly when the same is above the axis of revolution of the wheel. Each time arm 126 rotates in a counterclockwise sense, when viewing FIG. 5, counter 116 is actuated to register a unit which is viewed through window 132. Counter 116 is, therefore, capable of sensing and recording the number of revolutions of the wheel to which bar 112 is affixed. The distance travelled by the wheel may then be computed by multiplying the revolutions recorded on counter device 116 with the circumference of the wheel. A pair of spaced projections 128 may be secured to bar 112 to limit the swinging movement of arm 126.

The present invention therefore, provides a highly accurate means of determining the distance travelled by a vehicle and is, therefore, suitable for use with vehicles which travel over land having few or no reference markers. The present invention may be readily installed on the hub of a vehicle without altering the structure thereof and with the use of ordinary tools. If it is desired, a cover may be provided over the counter means of the present invention to keep out weeds, dirt or the like which would hamper the proper operation thereof.

Having thus described the invention, what is claimed as new and desired to the secured by Letters Patent is:

1. Measuring apparatus comprising:
   a vehicle provided with a ground wheel at least partially supporting the same;
   an elongated bar releasably secured to the wheel across its axis of rotation with its longitudinal axis coincident with the diameter of the wheel, said bar having a pair of longitudinally spaced stops thereon;
   a counter mounted on the bar;
   a reciprocable actuator for said counter carried by the bar for movement longitudinally thereof and along a path having extremities defined by said stops, said actuator being movable to one end of its path of travel and return to the opposite end of its path of travel during each revolution of the wheel over the ground to be measured; and
   means pivotally coupled with the actuator and with the counter for operating the latter to register the revolutions of the wheel, whereby the distance travelled may be calculated as the product of the total of said revolutions and the circumference of the wheel.

2. Measuring apparatus comprising:
   a vehicle provided with a ground wheel at least partially supporting the same;
   an elongated bar releasably secured to the wheel across its axis of rotation with one of its faces in engagement with the wheel and with its longitudinal axis coincident with the diameter of the wheel, said bar having a pair of longitudinally spaced stops secured thereto and projecting laterally from the opposite face thereof;
   a counter mounted on the bar;
   an elongated actuator for said counter carried by the bar for reciprocable, rectilinear movement longitudinally of said bar and along a path having extremities defined by said stops, said actuator being movable to one end of its path of travel and return to the opposite end of its path of travel during each revolution of the wheel over the ground to be measured, said path of travel being coincident with the longitudinal axis of the actuator and parallel with the longitudinal axis of the bar; and
   means pivotally coupled with the actuator and with the counter for operating the latter to register the revolutions of the wheel, whereby the distance travelled may be calculated as the product of the total of said revolutions and the circumference of the wheel.

3. Measuring apparatus as set forth in claim 2, each of said stops having an opening therethrough, said actuator including a stem and a weight rigid to the stem, the latter extending through said openings and being shiftable relative to said stops to mount the weight for reciprocation on said bar, said weight being alternately engageable with said stops and confined to said path thereby.

4. Measuring apparatus as set forth in claim 2, said stem being transversely polygonal, said openings being configured to complementally receive said stem, said counter operating means being pivotally coupled to said weight.

5. Measuring apparatus comprising:
   a wheel having a central axis of rotation;
   an elongated bar releasably secured to the wheel across said axis and disposed with the longitudinal axis of the bar coincident with the diameter of the wheel, said bar having a pair of longitudinally spaced stops thereon;
   a counter mounted on the bar;
   a reciprocable actuator for said counter carried by the bar for movement longitudinally thereof and along a path having extremities defined by said stops, said actuator being movable to one end of its path of travel and return to the opposite end of its path of travel during each revolution of the wheel about its axis; and
   means pivotally coupled with the actuator and with the counter for operating the latter to register the number of revolutions of the wheel as the latter is rotated.

References Cited in the file of this patent
UNITED STATES PATENTS

| 1,003,623 | Littlejohn | Sept. 19, 1911 |
| 2,655,314 | Hutsell | Oct. 13, 1953 |
| 2,817,906 | Hale | Dec. 31, 1957 |
| 3,011,704 | Durst | Dec. 5, 1961 |

FOREIGN PATENTS

| 798,647 | France | Mar. 10, 1936 |